United States Patent [19]
Lazzarini et al.

[11] B  4,000,016

[45] Dec. 28, 1976

[54] WATER SOLUBLE FLUXES

[75] Inventors: Donald J. Lazzarini, Binghamton; Frank H. Sarnacki, Johnson City, both of N.Y.

[73] Assignee: International Business Machines Corporation, Armonk, N.Y.

[22] Filed: Nov. 29, 1974

[21] Appl. No.: 527,972

[44] Published under the second Trial Voluntary Protest Program on March 9, 1976 as document No. B 527,972.

[52] U.S. Cl. .................................................. 148/23
[51] Int. Cl.$^2$ ........................................ B23K 35/34
[58] Field of Search .............................. 148/23–26

[56] References Cited

UNITED STATES PATENTS 2,493,372   1/1950   Williams ............................. 148/25
3,832,242   8/1974   Cuthbert ............................. 148/26

*Primary Examiner*—Peter D. Rosenberg
*Attorney, Agent, or Firm*—David M. Bunnell

[57] ABSTRACT

Water soluble fluxing bath compositions have particular value in immersion soldering of metallic surfaces and electrical connections in that they are characterized by good thermal and chemical stability and easy removal of flux residues without corrosion or insulation resistance hazards. The compositions comprise from about 2 to 8 percent by weight of chelating agents or salts dissolved in a solvent, such as glycerol. In some instances from about 0.1 to 1.0 percent of an inorganic acid, such as hydrochloric acid may be added.

11 Claims, No Drawings

WATER SOLUBLE FLUXES

BACKGROUND OF THE INVENTION

1. Field of the Invention

This invention relates to glycerol soldering fluxes and more particularly to flux bath compositions containing chelating salts dissolved in a glycerol solution.

2. Description of the Prior Art

In soldering electrical connections or surface soldering printed circuits, it is usually necessary to employ fluxes to wet, remove tarnish and activate the metallic surfaces being soldered. In addition, the flux must protect the activated surfaces against any passive film formation during alloying of the solder to metal circuits or surfaces being joined. To be effective, the flux bath has to be useful and operative at the soldering temperature employed. Furthermore, both the flux and flux residues have to be easily removable and/or non-corrosive to the metal contacts being soldered.

Prior art fluxes used in immersion bath soldering has the disadvantage of a narrow useful temperature range, a limited temperature life in high preheat exposure, a residue that was difficult to remove because of innate polymerization and retained flux activators becoming ionized by water leaching to promote local corrosion or low insulation resistance hazards. In addition, those prior art flux residues that required organic solvent cleaning to remove them, exposed organic encapsulating and laminate materials to a potential solvent degradation action involving swelling or partial dissolution thereof. Further, sometimes toxic vapors are emitted from the heated glycerol fluxes and contribute to the pollution level of the atmosphere.

SUMMARY OF THE INVENTION

These disadvantages of the prior art have now been overcome by the use of glycerin as a solvent in combination with chelating salts. This flux composition possesses thermal and chemical properties especially useful in fluxing operations. In addition, the higher flash point and boiling point of these glycerol solvents as compared with those used in the prior art minimizes the ignition hazard and premature evaporation of such fluxes, even under prolonged exposure conditions on an assembly line. The ability to wet land, plated-through-hole and lead surfaces of boards and components with a low melting solder (M.P. 65.6°–148.9° C.) while immersed in this water soluble fluxing bath provides for a relatively low temperature (93.3°–176.7° C.) solder process joining and a broader range for sequential solder packaging. Such processing eliminates or minimizes packaging stability and reliability problems associated with large thermal gradients, surface oxidation and improper post solder cleaning. The corrosion problems of prior art are also solved by such glycerol compositions, inasmuch as the residue of these substances, after a soldering operation, may be easily washed away through the use of water. The entrapment of undesirable contaminates is thereby largely eliminated. Even if some residue were to remain, however, it would be of a non-corrosive kind and in non-corrosive quantities.

A further important factor in the use of these solvents is that operating personnel would be unaffected when skin or clothing were to come into contact with these glycerol solvents, since said solvents are frequently used in cosmetic formulations, such as face and hand emulsions and thus are completely non-toxic.

Another important factor is the reduction and possible complete elimination of toxic vapors emitted by heated glycerol flux compositions heretofore.

It is, therefore, an object of this invention to produce a glycerol soldering flux composition in combination with chelating salts useful in immersion soldering operations involving metallic surfaces and electrical connections, and especially adapted for microelectronic packaging.

It is another object of the invention to provide a water soluble flux composition particularly adaptable as an immersion bath to perform preheating and soldering functions.

It is a further object of this invention to employ a composition comprising a solvent or carrier and a wetting agent, if desired, in order to produce the superior compositions of this invention.

Other objects and advantages will be more apparent and the invention will be more readily understood from the following description.

DESCRIPTION OF THE PREFERRED EMBODIMENTS

Briefly, this invention relates to soldering fluxes and particularly to flux bath compositions containing glycerol in combination with chelating salts with or without a very small amount of an inorganic acid, an activator such as hydrochloric acid. The glycerol serves both as a carrier and a wetting agent giving improved thermal and chemical stability to the immersion bath as compared to other solvents used heretofore. The chelating salt complexes undesirable contaminates present in the bath, such as zinc, over extended periods of time which means that the dissolved chelate prevents any of the undesirable ions from contaminating the device being fluxed and the solder that is always present in the bath. The inorganic acid, if used, helps to activate the metallic surfaces adequately without over etching to promote alloying of the solder to the contact surfaces. The composition is thermally stable over a wider temperature range than is available with oil base fluxes which are common in the prior art. The chelate flux composition is characterized by its excellent stability to heat, uniform fluxing over a long term usage, and an ability to use these fluxes on low and intermediate melting point alloys as well as some of the high melt solder alloys.

By immersing a printed circuit substrate in the glycerol-chelate salt formulations heated to 10°C–38°C above the solder melting point, the substrate can be preheated uniformly in a non-oxidizing environment and the solder made to (1) wet and reflow into electroplated or electroless plated surfaces, (2) seal plated-through-holes, or (3) reflow joined pins or leaded components to the substrate.

The successful use of the glycerol base-chelate salt flux compositions with both low and intermediate point (65°–149°C and 149°C–205°C, respectively) solder alloys provide a broader temperature range for sequential solder packaging (93°–233°C). The applicability of the baths to low melt alloys is of particular importance at the board level because it allows for assembly, disassembly and rework at markedly lower processing temperatures. The corresponding reduction in ΔT (the temperature difference between the environment and the bath, °C) results in a notable reduction in substrate thermal gradients and the differential thermal expansion stresses resulting therefrom. Consequently, this minimization of thermal stress affects an increase in both the stability and reliability of the substrate and the solder joints.

As the bath compositions are water soluble, both the flux and flux residues may be easily washed from the substrate or package surfaces by water. The entrapment of undesirable contaminants is thereby largely eliminated. Even if some residue were to remain, however, it would be of a non-corrosive kind and in non-corrosive quantities.

This invention is directed to the use of metal chelating salts in glycerol or other heat stable fluids for the purpose of forming immersion flux bath compositions. Sodium salts of ethylenediaminetetraacetic acid dissolved in glycerol were experimentally found to have particularly good fluxing characteristics. A variety of these chelate salts are available with uses identical or similar to the acid. Of the chelate salts, other immersion flux bath compositions were formulated comprising disodium ethylenediaminetetraacetate ($Na_2EDTA$), trisodium ethylenedinitrilo tetraacetate, tetrasodium ethylenediaminetetraacetate ($Na_4EDTA$), pentasodium diethylenetriamine pentaacetate ($Na_5DTPA$), and ethylenediaminetetraacetic acid ($H_4EDTA$).

In order to provide a better understanding of the details of this invention, the following examples of composition are illustrative of the invention. These examples, however, are by no means limitative and are merely presented here for help in describing the particular compositions involved.

Formulation No. 1 by weight; glycerol from about 92 to 97 percent; disodium ethylenediaminetetraacetate from about 2 to 8 percent.

Formulation No. 2 by weight; glycerol from about 92 to 97 percent; disodium ethylenediaminetetraacetate from about 2 to 8 percent; concentrated hydrochloric acid from 0.1 percent to 1.0 percent.

Formulation No. 1 has been found to be very stable with respect to fluxing action over long periods of time at elevated temperatures. The formulations, with or without an inorganic acid such as concentrated hydrochloric acid, are particularly useful and effective as fluxing agents for tin-bismuth solder applications. Other inorganic acids which may be used are: phosphoric acid ($H_3PO_4$), sulphuric acid ($H_2SO_4$), or nitric acid ($HNO_3$). The formulation No. 2 is an effective flux for tin-lead-indium alloys.

While the invention has been particularly shown and described with reference to preferred embodiments thereof, it will be understood by those skilled in the art that the foregoing and other changes in form and details may be made therein without departing from the spirit and scope of the invention.

We claim:
1. A fluxing composition comprising:
   from about 2 to 8 percent by weight of a chelating agent, and
   from about 92 to 97 percent by weight of glycerol.
2. The composition of claim 1 further comprising from about 0.1 to 1.0 percent of an inorganic acid.
3. The composition of claim 1 wherein the chelate salt is disodium ethylenediaminetetraacetate.
4. The composition of claim 1 wherein the chelate salt is trisodium ethylenedinitrilo tetraacetate.
5. The composition of claim 1 wherein the chelate salt is tetrasodium ethylenediaminetetraacetate.
6. The composition of claim 1 wherein the chelate salt is pentasodium diethylenetriamine pentaacetate.
7. The composition of claim 1 wherein the chelate salt is ethylenediaminetetraacetic acid.
8. The composition of claim 2 wherein the inorganic acid is concentrated hydrochloric acid.
9. The composition of claim 2 wherein the inorganic acid is phosphoric acid.
10. The composition of claim 2 wherein the inorganic acid is sulphuric acid.
11. The composition of claim 2 wherein the inorganic acid is nitric acid.

* * * * *